(12) United States Patent
Thevenon

(10) Patent No.: US 6,280,333 B1
(45) Date of Patent: Aug. 28, 2001

(54) HYDROKINETIC COUPLING APPARATUS WITH LOCKING CLUTCH FOR MOTOR VEHICLE

(75) Inventor: Luc Thevenon, Lyons (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/254,007

(22) PCT Filed: Jun. 17, 1998

(86) PCT No.: PCT/FR98/01280

§ 371 Date: Jun. 14, 1999

§ 102(e) Date: Jun. 14, 1999

(87) PCT Pub. No.: WO99/01682

PCT Pub. Date: Jan. 14, 1999

(30) Foreign Application Priority Data

Jun. 30, 1997 (FR) .................................................. 97 08386

(51) Int. Cl.[7] ...................................................... F16D 3/12
(52) U.S. Cl. ........................ 464/68; 192/3.29; 192/212; 464/66
(58) Field of Search ................................ 464/24, 26, 64, 464/66, 68; 192/3.29, 3.3, 55.61, 212

(56) References Cited

U.S. PATENT DOCUMENTS

| 5,215,173 | * | 6/1993 | Gimmler | 192/3.3 |
|---|---|---|---|---|
| 5,575,363 | * | 11/1996 | Dehrmann et al. | 192/3.3 |
| 5,669,475 | * | 9/1997 | Matsuoka | 192/3.29 |
| 5,826,688 | * | 10/1998 | Arhab et al. | 182/3.29 |
| 5,829,561 | * | 11/1998 | Arhab | 192/3.29 |
| 5,860,500 | * | 1/1999 | Olsen et al. | 192/3.29 |
| 5,964,329 | * | 10/1999 | Kawaguchi et al. | 192/3.3 |
| 6,123,177 | * | 9/2000 | Arhab | 192/3.29 |

FOREIGN PATENT DOCUMENTS

| 41 21 586 | 1/1993 | (DE) . |
|---|---|---|
| 4433256 | 5/1995 | (DE) . |
| 0 232 622 | 8/1987 | (EP) . |
| 2726620 | 5/1996 | (FR) . |
| WO 97/47901 | * 12/1997 | (FR) . |
| 96 07 146 | 12/1997 | (FR) . |
| WO 98/53225 | * 11/1998 | (FR) . |
| 2772103 A1 | * 6/1999 | (FR) . |
| WO 9313338 | 7/1993 | (WO) . |

* cited by examiner

Primary Examiner—Lynne H. Browne
Assistant Examiner—Aaron M Dunwoody
(74) Attorney, Agent, or Firm—Liniak, Berenato, Longacre & White

(57) ABSTRACT

The invention concerns a piston (20) mounted axially movable along a guide bearing (59) pertaining to a hub (5) rim (52); a ring (21) being inserted between the hub (5) and a transverse wall, the hub (5) has a sleeve (50) penetrating inside the ring (21).

13 Claims, 8 Drawing Sheets

HYDROKINETIC COUPLING APPARATUS WITH LOCKING CLUTCH FOR MOTOR VEHICLE

BACKGROUND OF THE INVENTION

The present invention concerns hydrokinetic coupling appliances, notably for motor vehicles, equipped with a locking clutch, usually referred to as a "lock-up" clutch, for mechanically making their turbine wheel and their impeller wheel integral with respect to rotation, as described for example in the document FR-A-2 726 620.

DESCRIPTION OF RELATED ART

In this document, the hydrokinetic coupling appliance has, inside a sealed casing, filled with oil, a torque converter having a turbine wheel and an impeller wheel, and a lock-up clutch.

The casing has a first half-shell provided with an axially fixed transverse wall by means of which it is connected to the driving shaft. The turbine wheel is connected to an internally fluted hub for rotatably connecting it to a driven shaft.

The first half-shell, and therefore the casing, forms the input element of the hydrokinetic coupling appliance which is rotary in operation, whilst the hub forms the output element of the said appliance.

Being a case of an application for a motor vehicle, the driving shaft consists of the crankshaft of the vehicle engine, whilst the driven shaft consists of the input shaft of the transmission box.

The lock-up clutch has at least one friction lining which, fixed with respect to rotation to the turbine wheel and hub, either directly, or indirectly by means of a torsion damper, is disposed axially between on the one hand the said transverse wall fixed with respect to the impeller wheel and on the other hand a piston which is mounted so as to be able to move axially with respect to the transverse wall forming a counter-piston.

This piston is rotatably connected to the transverse wall, usually by elastic tongues substantially elongated tangentially to a circumference of the whole.

These tongues are mounted inside a variable-volume control chamber delimited on the one hand radially externally by the friction lining and radially internally by a cylindrically shaped centring device adjacent to the transverse wall and on the other hand axially by the piston and transverse wall.

The centring device consists of a ring which has at its centre a blind hole and passages for connecting the control chamber to the blind hole in communication with the driven shaft provided with a feed channel.

The ring is interposed axially between the hub and the transverse wall.

This ring forms a guide surface for the piston and is fixed by welding or force fitting, or crimping, to the transverse wall.

As a result the arrangement is axially bulky.

The object of the present invention is to mitigate this drawback, in a simple and economical fashion.

SUMMARY OF THE INVENTION

According to the invention, a lock-up clutch of the type indicated above is characterised in that, the hub having an internally fluted socket, for connecting the hub with the driven shaft with respect to rotation, the said socket enters inside the blind hole in the centring device, in that the hub has, parallel to its socket and radially beyond it, an axially oriented annular rim whose external periphery constitutes a guide surface for the piston, and in that a sealing joint acts between the said rim and the piston.

By virtue of the invention the axial bulk is reduced and a sealing joint is saved.

In fact, it would have been possible to create the guide surface on the centring device, hereinafter referred to as the ring, but in this case it would have been necessary to provide one joint at the guide surface and another joint at the hub in order to prevent oil passing between the hub and ring when the lock-up clutch is engaged.

Here, with a single joint there is a perfect seal, both when the lock-up clutch is engaged and when it is disengaged.

According to another characteristic, an annular recess being formed between the rim and the socket, the ring enters inside the groove.

Thus the hub and ring fit into each other, so that the axial bulk is reduced.

The hub guide surface is roughly axially aligned with the external periphery of the ring. An axially oriented bearing is housed in the recess and acts between the internal periphery of the ring and the external periphery of the socket for centring the hub. In one embodiment, the bearing is fixed to the ring. An axial clearance exists between the ring and the internal periphery of the hub rim.

An axial stop is mounted in the recess, between the base of the recess and the rear end of the ring.

This arrangement facilitates a rotation movement of the hub with respect to the ring.

The piston has, at its internal periphery, a ferrule directed axially in the direction of the hub.

An axial clearance exists between the free end of the rim of the hub and the ring.

Thus friction between the ring and hub is minimised, which makes it possible to obtain correct functioning, the hub being in contact with the ring at the axial stop and bearing.

The hub has a groove serving to house another axial stop for minimising friction between the free end of the ferrule of the piston and the hub.

The ring thus forms a centring device for the hub and, at the same time, allows feeding of the control chamber delimited by the piston and the transverse wall, the said ring having, in a known fashion, passages for the chamber to communicate with the inside of the ring (the blind hole thereof) fed with fluid by means of the driven shaft.

The hub socket can come as close as possible to the passages adjacent to the transverse wall.

Thus the socket can have great axial length, which enables the hub to slide well along the driven shaft.

The hub has a shield at its rear end furthest away from the transverse wall.

The hub rim issues from this shield, which closes off the recess inside which the ring enters.

The rim is shorter axially than the socket in order to allow the ring to feed, via its passages, the said control chamber.

The shield can have, at its external periphery, a countersink for fixing the turbine wheel and output element of the torsion damper associated with the lock-up clutch.

The hub thus has the shape of an annular comb with three annular teeth of different axial length, one tooth delimiting the countersink, the other forming the rim and the last the socket.

All this makes it possible to reduce to the maximum extent the axial bulk at the centre of the hydrokinetic appliance whilst having a good seal and good supply to the control chamber.

It will be appreciated that the ring is simply machined so as to be able to enter the recess.

BRIEF DESCRIPTION OF THE DRAWINGS

The description which follows illustrates the invention with regard to the accompanying drawings, in which.

DETAILED DESCRIPTION OF PREFERRED EMBODIMENT

Figure 1:
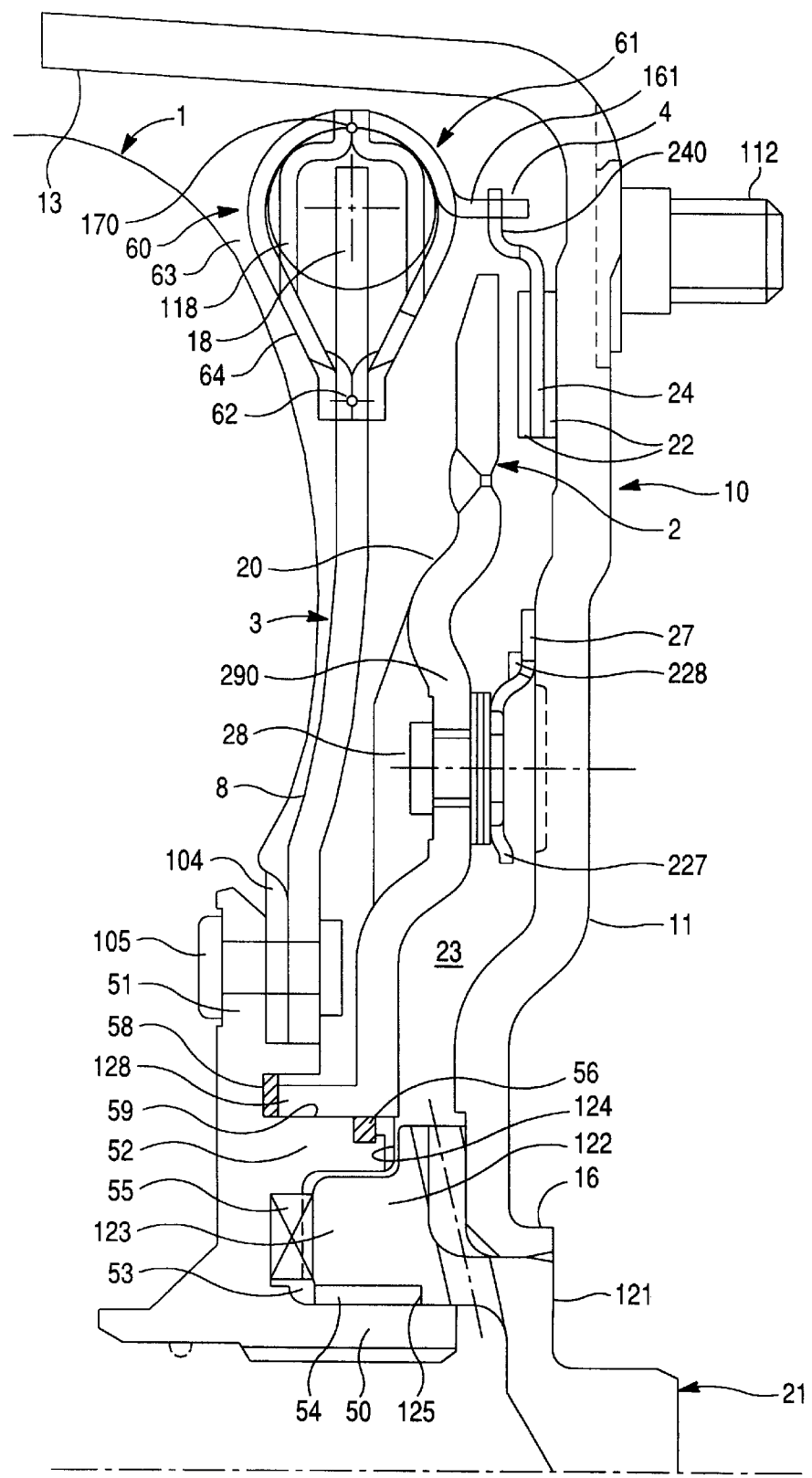
FIG. 1 is a partial half-view in axial section of the hydrokinetic coupling appliance showing the lock-up clutch according to the invention.

The hydrokinetic coupling appliance depicted in the figures is able to rotate about an axial axis of symmetry X—X and has, inside a sealed casing 10 filled with oil, a torque converter 1 and a lock-up clutch 2 provided with a torsion damper 3.

This appliance is intended to equip a motor vehicle with an internal combustion engine.

As is known, the torque converter 1 has an impeller wheel 100 with blades, a turbine wheel 101 with blades, a reaction wheel 102 and a freewheel 103 associated with the reaction wheel 102. All these elements are partially visible in FIG. 2.

The casing 10 has a first half-shell 12 and a second half-shell 16 and forms the input element of the hydrokinetic coupling appliance by means of its first half-shell 12.

The first half-shell 12 has a wall 11 of roughly transverse orientation extended at its external periphery by an axially oriented cylindrical rim 13.

The transverse wall 11 carries screws 112 (FIG. 1) for connecting it to a shield 113 (FIG. 2) fixed to a driving shaft 200, here the crankshaft of the vehicle engine.

The blades of the impeller wheel 100 issue from the internal face of the second half-shell 16, here attached by welding to the free end of the rim 13.

For more information reference should be made to the document FR-A-2 695 975, the fixing of the half-shells being not being depicted here for reasons of simplicity.

The blades of the turbine wheel 101 are opposite to the blades of the impeller wheel 100.

The turbine wheel 101 is fixed at its internal periphery, by means of lugs 104, to a hub 5 forming the output element of the hydrokinetic coupling appliance.

This hub 5 has at its centre an internally fluted socket 50 for connecting it with respect to rotation to a driven shaft 201, here the input shaft of the vehicle transmission box.

As is known, when the vehicle is started up, the impeller wheel 100 drives the turbine wheel 101 by virtue of the circulation of oil between the blades of the turbine 101 and impeller 100 wheels.

During this phase, the lock-up clutch 2 is disengaged or declutched, so that the torque is transmitted from the crankshaft to the first half-shell 12 and then to the hub 5 and to the driven shaft via the torque converter 1.

Next, in order to prevent any slip between the turbine 101 and impeller 100 wheels, the lock-up clutch 2 is engaged (clutched), so that the torque is transmitted from the crankshaft to the first half-shell 12 and then to the hub 5 and to the driven shaft via the lock-up clutch 2, whose torsion damper 3 is connected to the hub 5 and damps the vibrations generated by the vehicle engine.

To do this, the lock-up clutch 3 has here a piston 20, roughly of transverse orientation, mounted so as to be able to move axially in a sealed fashion along an axially oriented guide surface 59, as described below.

The clutch 2 also has two friction linings 22 disposed on each side of a drive disc 24.

The linings 22 and disc 24 are located axially between the piston 20 and the transverse wall 11 forming a counter-piston. This wall 11 is fixed axially.

A variable-volume control chamber 23 is delimited on the one hand laterally (axially) by the piston 20 and the wall 11 and on the other hand radially on the inside by a centring device 21, here cylindrical in shape, and radially on the outside by the linings 22 and disc 24.

The centring device 21 is fixed to the central part of the wall 11, as described below, and is provided at its centre with a blind hole 120 able to be fed with fluid from the driven shaft, projecting axially with respect to the second half-shell 16.

To do this, the driven shaft (depicted in broken lines at 201 in FIG. 2) has its centre a feed channel, whilst the centring device 21 has passages 221 for its blind hole 120 to communicate with the control chamber 23.

A principal chamber exists on the side of the piston 20 turned in the opposite direction to the transverse wall 11 and chamber 23.

The centring device 21 is located axially between the hub 5 and the wall 11, that is to say between the output and input elements of the hydrokinetic coupling appliance.

For reasons of simplicity, this centring device will hereinafter be referred to as the ring, since it is roughly in the form of a stepped ring machined at the rear, as described below.

By causing the pressure to vary on each side of the piston 20, for example by varying the pressure in the chamber 23, the piston 20 is allowed to move axially with respect to the axially fixed wall 11, either to clamp the friction linings 22 and disc 24 between the piston 20 and wall 11, or to unclamp the linings 22 and disc 24.

In the first case, the lock-up clutch is engaged or clutched at the end of the axial movement of the piston 20 in the direction of the wall 11.

In the second case, the piston 20 moves in the opposite direction to the wall 11 in order to disengage or declutch the clutch.

Here the friction linings 22 are fixed to the disc 24 whilst being for example bonded or brazed to the faces of the disc 24 on each side thereof.

As a variant, the linings are fixed to the piston 20 and transverse wall 11.

Thus the piston offers, at its external periphery, a friction face for the adjacent lining 22 or forms a fixing face for the said lining.

Naturally an intermediate piece can be fixed to the wall 11 in order to constitute a friction face for the relevant lining 22.

The disc 24 extends radially above the piston 20 in order to be connected, by a connection of the mortise and tenon type 4, to the torsion damper 3 which is thicker at its external periphery in the vicinity of the rim 13.

The torsion damper 3 has two coaxial parts 7, 8 mounted so as to be able to move angularly with respect to each other counter to circumferentially acting elastic means 6, here in the form of coil springs.

One of the parts, referred to as the input part 7, has two guide washers 60, 61 disposed on each side of the other part 8 in the form of a damper plate fixed at its internal periphery to the hub 5.

The input part 7 is connected with respect to rotation to the drive disc 24 by the mortise and tenon type connection 4 allowing axial movement of the disc 24.

Thus the input part 7 is disengageably connected to the transverse wall 11 forming part of the input element of the hydrokinetic coupling appliance, whilst the output part 8 is connected the output element 5 of the said appliance.

The damper 3 is located axially between the turbine wheel 101 and piston 20.

The hub 5 has, in a single piece with the socket 50, at its rear end, furthest away from the transverse wall 11, a transversely oriented shield 51 thinner at its external periphery in order to form a countersink delimiting an axially oriented shoulder, not referenced, for centring the damper plate 8 and lugs 104 of the turbine wheel 101. Rivets 105 connect the lugs 104 and damper plate 8 to the shield 51 and therefore to the hub. The damper plate 8 and lugs 104 are disposed side by side on the same side of the shield 51, the lugs 104 being in contact with the shield 51.

As a variant, the lugs 104 and damper plate 8 are disposed each side of the shield 51.

The lugs 104 and damper plate 8 can then be fixed by welding.

The ring 21 is stepped in diameter and is fixed, in a known fashion, by welding to a sleeve 16, directed towards the outside in the opposite direction to the piston 20, which the transverse wall 11 has at its centre.

Thus the ring 21 has on the one hand a front portion 121 with a smaller diameter forming a centring device and fixed by welding to the sleeve 16 and on the other hand a rear portion 122 with a larger diameter in which there are produced the passages 221 for communication between the chamber 23 and the central blind hole 120 in the ring 21. The ring 21, through its stepped front portion 121, is fitted in the sleeve 16 whilst being welded to the free end thereof by a welding bead.

The ring 21 is therefore centred by the transverse wall 11, the shoulder formed by the change in diameter between the portions 121, 122 being in abutment against the internal face of the wall 11 turned towards the piston 20.

According to one characteristic, the hub 5, directed axially towards the wall 11, enters through its socket 50 into the blind hole 120 in the ring 21 for reduction of the axial bulk at the centre of the hydrokinetic coupling appliance between the reaction wheel 102 and the transverse wall 11. The socket 50 extends axially as far as the passages 221 so as not to close them off and so as to increase its length to the maximum extent, which assists its sliding along the driven shaft 201.

The hub 5 has an axially oriented annular rim 52 issuing in a single piece from the shield 51 and directed axially towards the wall 11. This rim 52 therefore extends parallel to the hub 5 to the socket 50. It extends radially beyond the socket 50.

The rim 52 is shorter axially than the socket 50 and defines with the latter an annular recess 53 with a bottom closed off by the shield 51.

The ring 21 enters the recess 53 through its rear end 123 belonging to the rear portion 122. The pieces 21 and 5 therefore fit into each other.

A bearing 54 is interposed radially between the internal periphery of the rear portion 122 entering the groove 53 and the external periphery of the hub 5 in order to centre the hub 5 with respect to the ring 21. Here the bearing is fixed to the ring 21 and constitutes a pilot bearing.

An axial stop 55, here a needle bearing, acts between the transversely oriented bottom of the recess 53 and the rear face of the ring 21. To do this, the shield 51 is hollowed out locally in order to receive the stop 55.

A radial clearance exists between the external periphery of the rear portion 122 of the ring 21 and the internal periphery of the rim 52, the ring being of reduced diameter at this point in order to be able to enter the groove 53.

An axial clearance also exists between the free end of the rim 52 and the shoulder 124 formed by the change in diameter which the rear portion 122 has so that it can enter inside the annular groove 53.

As a result the external periphery of the rim 52 has roughly the same diameter as the larger-diameter external periphery of the rear portion 122, whilst being axially aligned with it.

The passages 221 affect the larger-diameter part of the portion 122 and are partly adjacent to the wall 11.

The passages 221 are formed by drillings opening out in the hole 120 and extended outwards by radial grooves affecting the face of the rear portion 122 in contact with the wall 11.

The piston 20 is here mounted so as to slide along a guide surface 59 formed by the external periphery of the rim 52, provided with a recess (not referenced) in the vicinity of its free end for mounting a sealing joint 56. This joint is a joint of the dynamic type since a relative rotation movement can occur between the piston 20, fixed with respect to rotation to the wall 11, and the hub 5 fixed to the turbine wheel 101.

For its sliding along the guide surface 59, the piston 20 has, at its internal periphery, an axially oriented ferrule 128 directed towards the shield 51, which has a groove 57 for housing an axial stop 58 intended to cooperate with the rear face of the ferrule 128 in order to reduce friction. The countersink and the groove delimit another rim (not referenced) parallel to the rims 51 and to the socket 50 and being axially shorter than them. The hub 5 thus has a comb shape with annular teeth with different and increasing lengths.

As a variant, the ferrule 128 can carry the joint 56 by means of a recess.

When the lock-up clutch 2 is engaged the liquid (oil) cannot enter the chamber 23 since the linings 22 are clamped and the joint 56 prevents any entry. The turbine wheel 101 is then mechanically fixed to the impeller wheel 100.

When the clutch is disengaged the liquid cannot flow towards the rim 51 because of the joint 56.

Naturally, the rear portion 122 has a shoulder 125 at its internal periphery, formed by means of a change in diameter, for cooperating with the front face of the bearing 54 mounted in the recess 53.

The external periphery of the socket 50 is in close centring contact with the internal periphery of the bearing 54 here fixed to the ring 21 different from that of a ring of the prior art through the machining of its rear portion.

The piston 20 is integral with respect to rotation with the transverse wall by means of tangential tongues 26 allowing axial movement of the piston along the rim 52 and its surface 59.

The tangential tongues 26, mounted in the chamber 23, act between the wall 11 and piston 20. The tongues 26 are fixed to a drive piece 27 fixed to the wall 11. This piece 27 can be extended radially in order to offer a friction force to the lining 22 concerned.

Such a mode of assembly is described in the document FR-A-2 726 620.

Thus the tongues 26, here mounted in a superimposed fashion, whose number depends on the application, are fixed by riveting at one of their ends to the drive piece 27, itself fixed by riveting to the wall 11, by means of rivets 228, issuing by extrusion from the wall 11.

For this purpose, the drive piece has locally parts offset axially in the direction of the piston 20 for fixing the tongues. These parts are in the form of brackets 227.

As a variant, the drive piece 27 can be fixed to the wall 11 by welding or bonding.

As a variant, the tongues 26 are fixed directly to protrusions issuing from the wall 11 and provided with extrusions for riveting the tongues 26.

Naturally, the tongues 26 can be in a single piece with the drive piece.

For more information, reference should be made to the application FR-A-2 726 620.

The tongues 26 are fixed at the other end by means of rivets 28 to the piston 20.

This is achieved by means of holes 29, here shouldered, which the wall 11 has coinciding axially with the rivets 28.

This makes it possible to avoid the use of two-part fixing means, as described in the document FR-A-2 726 620.

Thus, as in this document, the tongues 26 are first of all fixed, either directly to the wall 11, or the assembly consisting of drive piece 27 and tongue 26 to the wall 11.

Next, after fitting the disc 24, equipped with the two friction linings 22, between the wall 11 and the piston 20, the tongues are fixed by riveting, using rivets 28, to the piston 20, by introducing a tool into each hole 29 in order to deform the head of the rivet 28, a counter-tool acting on the other side of the piston 20 in order to form a support for the foot of the rivet 28. Preferably a removable centring device is used, engaged in the sleeve 16 for centring the ferrule 128 of the piston 20 during the operation of fixing the tongues 26 to the piston 20, and then the centring device is withdrawn and the ring 21 is fixed to the wall 11.

Naturally, the tongues 26 are fixed to the piston by means of dished parts 290 projecting axially in the direction of the wall 11, which the piston 20 has radially between its internal and external peripheries; the internal periphery of the piston 20 being offset axially in the opposite direction to the wall 11 with respect to its external periphery forming a friction face for the relevant lining 22.

For this purpose, the piston 20 has an inclined portion between its external and internal peripheries. It is in this inclined portion that the dished parts 290 are formed.

The number of tongues 26 and therefore of protrusions 290 depends on the application.

Naturally, afterwards the holes are closed off by means of fluidtight plugs 129. Here the plugs 129 are shouldered and fixed by welding, or as a variant by screwing or bonding, to the wall 11.

It should be noted that the shield 113 (FIG. 2), fixed by the screws 112 to the wall 11, has holes (not referenced) coinciding axially with the holes 29 for the tool and plug 129 to pass.

Figure 7:
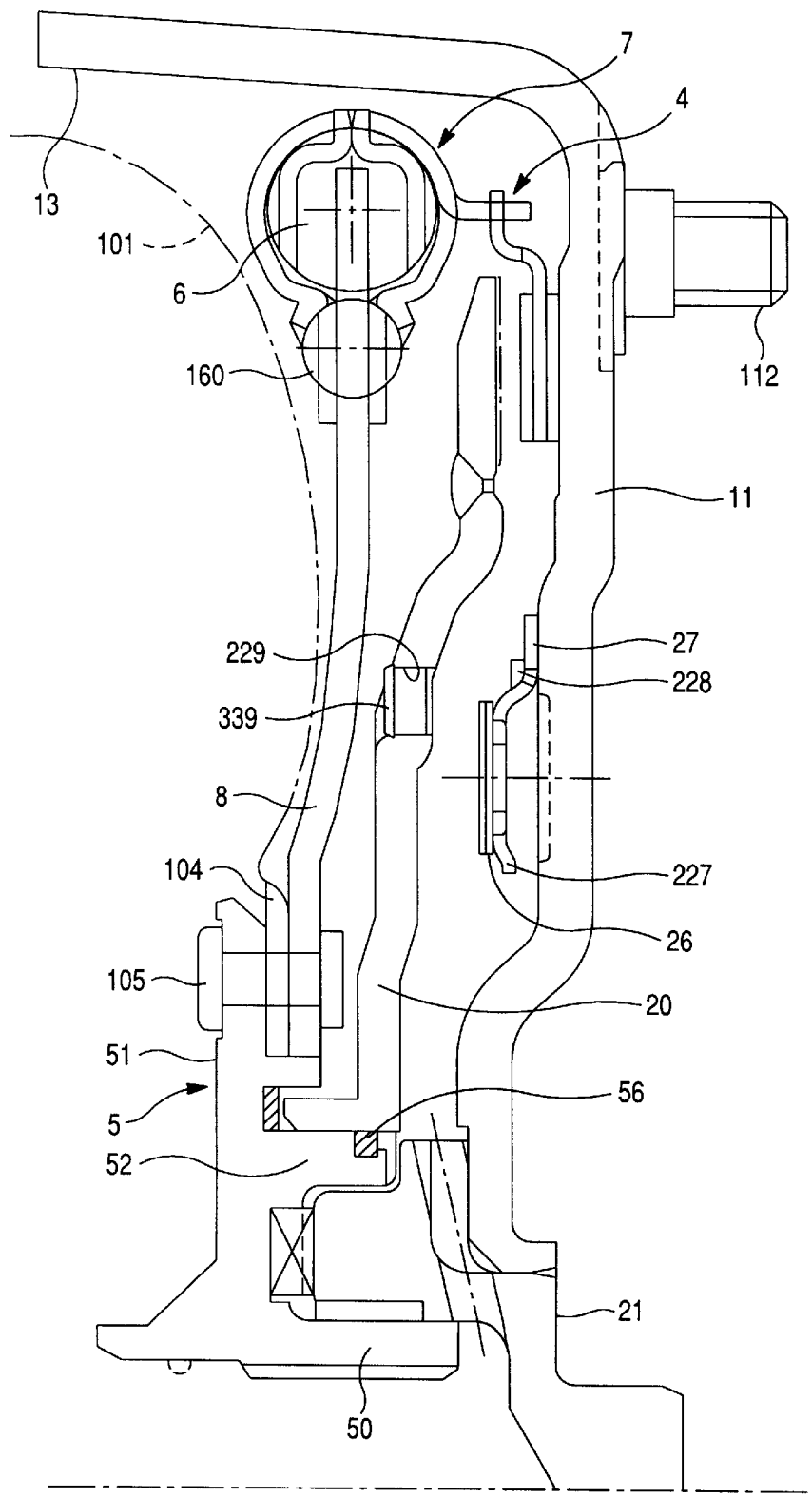
FIG. 7 is a view similar to FIG. 1 for a third example embodiment.

Naturally the structures can be reversed, as can be seen in FIG. 7.

Thus the tongues are first of all fixed to the piston by means of the rivets 28, then afterwards the tongues 26 or drive piece 27, to which the tongues 26 are previously fixed, are fixed to the wall 11, the piston 20 having holes 229 coinciding axially with, for example, fixing rivets 228 issuing by extrusion from the wall 11. These holes enable a tool to pass to crush the rivets. Next the holes are plugged by means of a plug 339.

The torsion damper 3 has, according to one characteristic, two guide rings 60, 61 of symmetrical shape in order to reduce costs.

The two guide rings 60, 61 are symmetrical (identical overall), disregarding the drive lugs 161 on the guide ring 61, referred to as the first guide ring, closest to the piston 20.

The other guide ring 60, referred to as the second guide ring, is adjacent to the turbine wheel 101.

The guide rings 60, 61 are obtained with the same tooling. An additional operation is performed on the first guide ring 61 in order to obtain lugs 161 obtained by cropping and bending.

The lugs 161 are axially oriented and engaged in notches, not referenced, open radially towards the outside, and formed at the external periphery 240 of the disc 24. This external periphery 240 is offset axially with respect to its plane main part of the disc 24 to which the friction linings 22 are fixed.

The axial offsetting of the external periphery is effected in the direction of the first guide ring 61 in order to reduce the axial length of the lugs 161 offset radially towards the inside with respect to the external periphery of the guide rings 60, 61.

These guide rings 60, 61 are located at the external periphery of the turbine wheel 101 and wall 11. The external periphery of the rings 60, 61 extends in the vicinity of the rim 16 of the first half-shell 12.

Thus the springs 6 can extend to a major extent radially above the piston 20 and come as close as possible to the rim 13. The torsion damper 3 can allow large relative angular movements between its input part 7 and its output part 8, fixed at its internal periphery to the shield 51 of the hub 5, here by riveting, in the aforementioned manner.

The output part 8, forming a damper plate, has a curved shape to match the shape of the turbine wheel 101, so that the internal periphery of the damper plate 8 is offset axially in the direction of the shield 51 with respect to its external periphery extending parallel to the said internal periphery.

The external periphery of the damper plate 8 is formed by lugs 18 forming support lugs for the ends of the coil springs 6. The springs 6 extend between two consecutive lugs and have a long circumferential length.

Opposite the lugs 18, the guide rings 60, 61 have, facing, dished parts 118 for supporting the circumferential ends of the springs 6.

The guide rings 60, 61 are connected together at their internal periphery by means of lugs 62 issuing from the rings and engaged between two lugs 18. The lugs 62 extend at the external periphery of the damper plate 8.

Between the dished parts 118, the rings 60, 61 have a curved shape and are contiguous at the level of their free external edges. These rings are fixed together by means of welding points effected at the dished parts 118 and lugs 62, here contiguous.

The dished parts 118 are also contiguous (FIG. 1) and it is in this area that the fixing by welding is effected.

Figure 3:
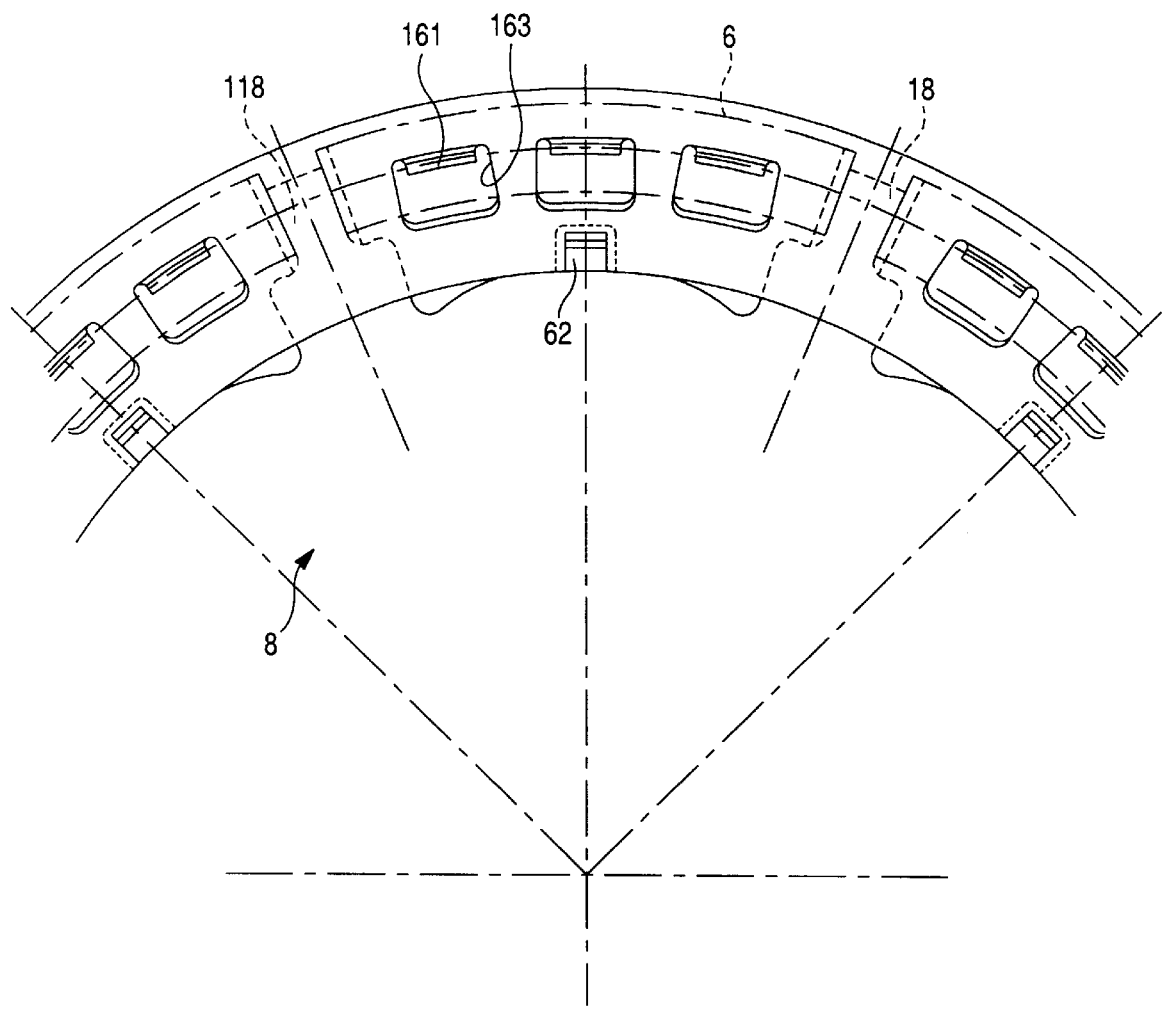
FIG. 3 is a partial front view of the guide ring with lugs of the torsion damper forming part of the lock-up clutch.
Figure 4:
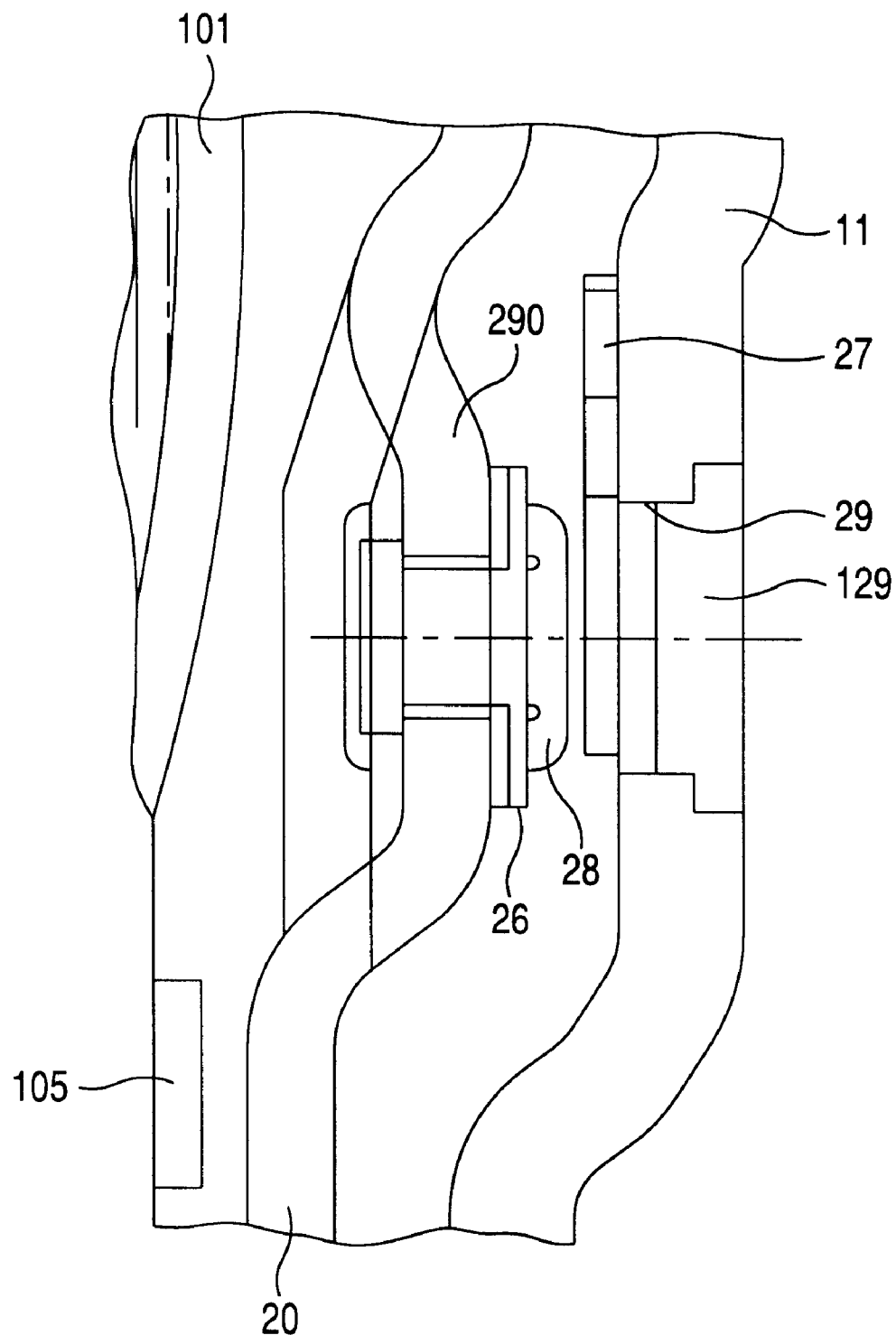
FIG. 4 is a partial view in axial section showing, to a large scale, one of the plugs closing off the transverse wall.

It will be noted that the lugs 161, forming lugs for connecting in rotation, issue from apertures 163 produced in the curved parts of the guide rings 60, 61 matching the shape of the coil springs 6, shown diagrammatically in broken lines in FIG. 3. The springs 6 are therefore held axially and radially by the guide rings 60, 61. These rings 60, 61, once assembled, externally envelop the springs 6 and have a circular contour 63 extending over more than 180° and extended at each of its ends by an inclined part 64. The inclined parts are convergent and it is in these that the lugs 62 are produced.

Naturally the rings 60, 61 are made from pressed plate.

The same applies to the wall 11 and piston 20. The inclined parts 64 make it possible to progressively reduce the axial bulk. This profile enables the guide ring 60 to come as close as possible to the turbine wheel 101.

Naturally, FIGS. 5 and 6, it is possible to profit from the inclined parts 64 in order to provide apertures 263 opposite these and to house, radially below the springs 6, a second series of springs 160, housed radially above the external periphery of the damper plate 8 and circumferentially between two lugs 18. The springs 160 are end-of-travel springs, the lugs 18 coming to compress the said coil springs at the end of the relative angular movement between the parts 7 and 8.

Figure 2:
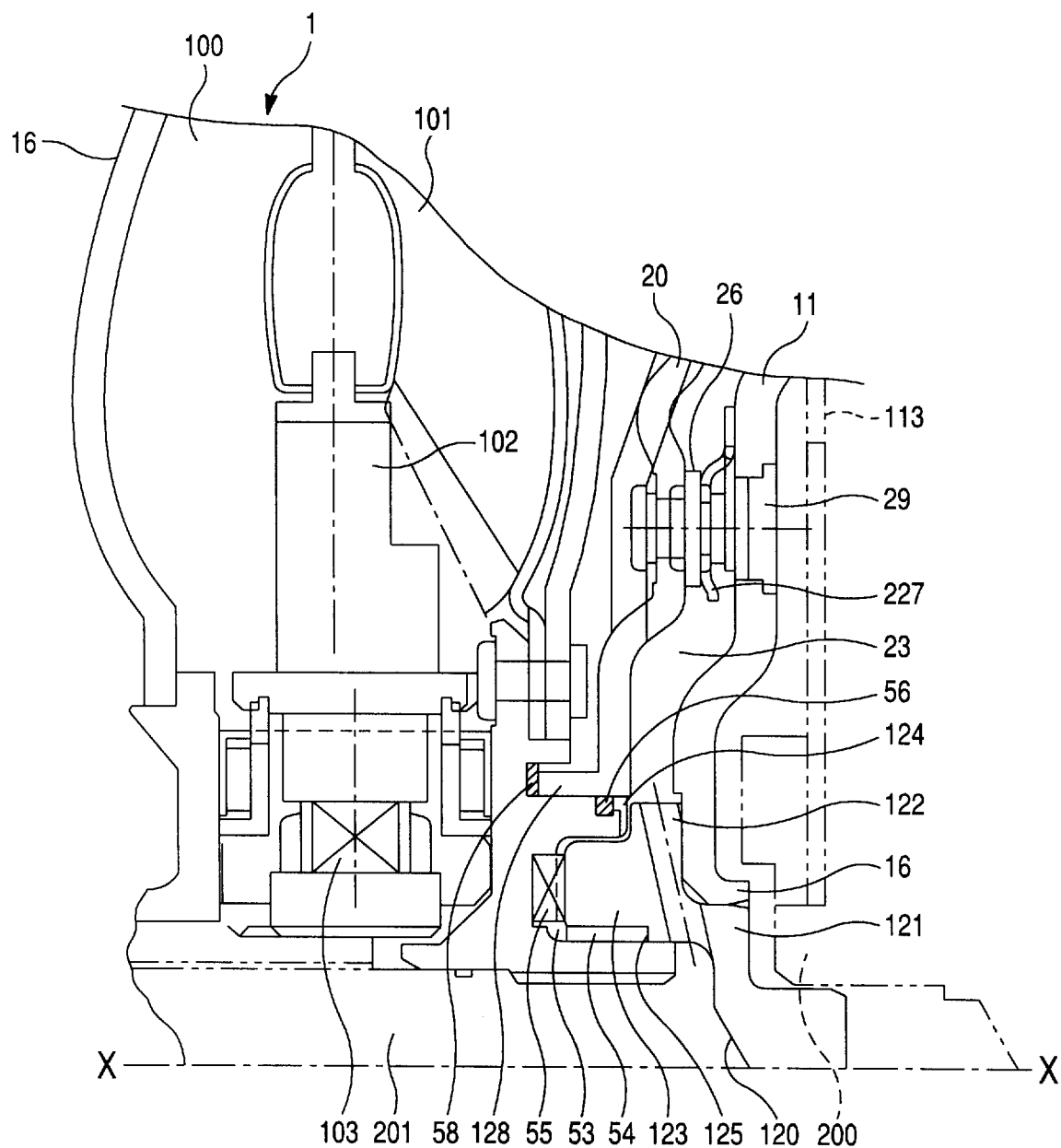
FIG. 2 is a view to a larger scale of the bottom part of FIG. 1 with depiction of the components of the torque converter.

These inclined parts can be dished locally at 165 in order to form support areas for braces, for example small columns 262 connecting together the guide rings 60, 61 and replacing the lugs 62 of FIG. 2.

FIG. 7 shows the same configuration, the difference relating to the holes 229, not shouldered, and plugs 339 affecting the piston 20 in the aforementioned manner for the fixings of the tongues. Thus the different figures can be combined together.

Figure 5:
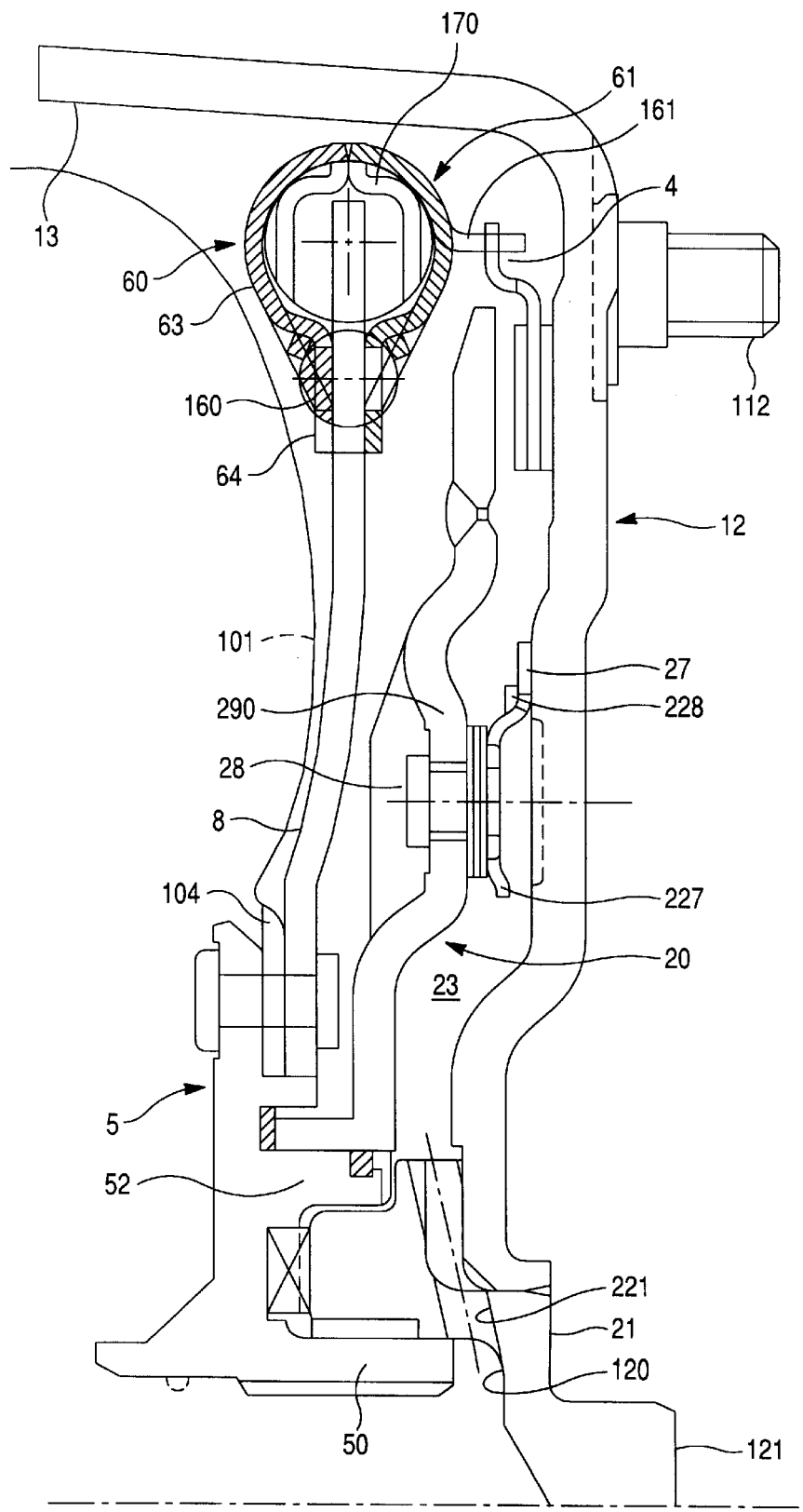
FIGS. 5 and 6 are views similar to FIGS. 1 and 3 for a second example embodiment.
Figure 8:
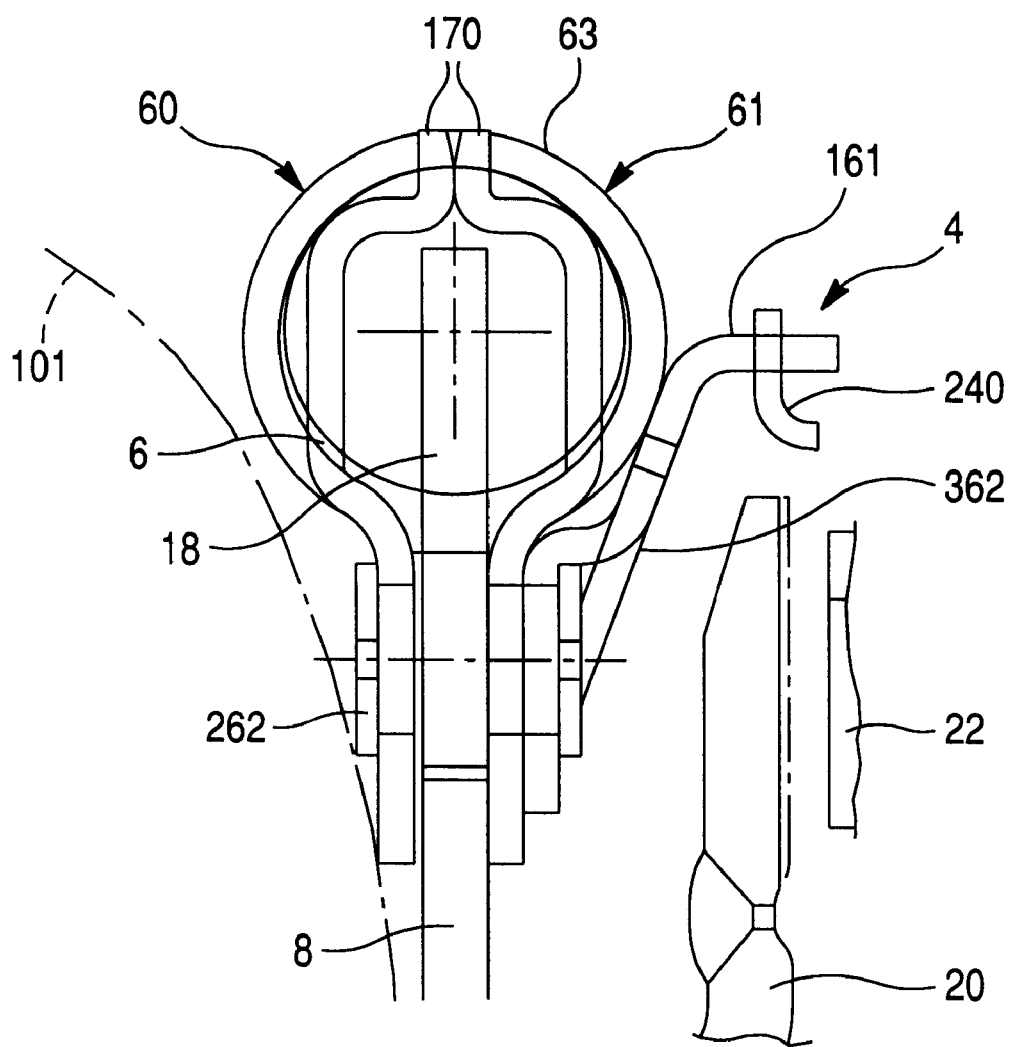
FIG. 8 is a partial view similar to FIG. 1 for a fourth example embodiment.

In FIG. 8 the fixing of the lugs 62 of FIG. 3 has been replaced by the fixing of the small columns 262 of FIG. 5, a single row of springs being provided.

In this case, the guide rings 60, 61 are identical and therefore symmetrical, and the lugs 161 belong to a ring 362 fixed to the guide rings 60, 61 by the small columns 262, the ring 362 being tapered in shape and dished locally for supporting the small columns 262.

It will be noted that, in this FIG. 8, the circular contour 63 has a greater circumferential extent and extends over almost 360° and is connected to transverse parts 164 to which the small columns are fixed.

In all the figures the guide rings 60, 61 are contiguous at their top (at their external periphery) and are fixed locally by welding at this point, between the springs 6 in the dished parts 118. These dished parts 118 are deformed locally at the centre in order to form two contiguous transverse areas 170 extending radially above the lugs 18 of the damper plate 8.

Figure 6:
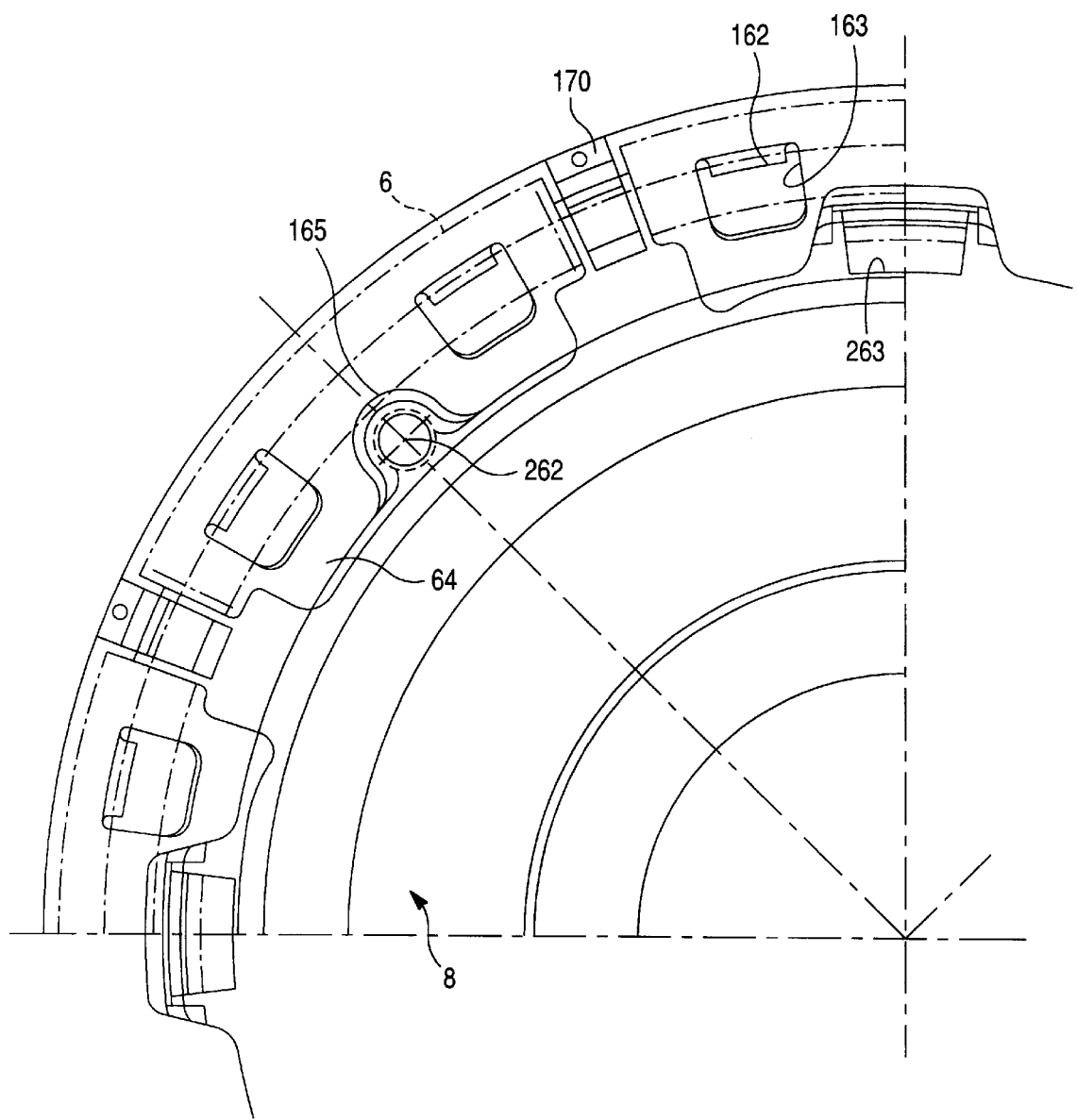

The welding is carried out in these areas 170, visible in one case in FIG. 6.

At their internal periphery the guide rings are connected together by lugs 62 or braces 262.

Naturally, the sleeve 16 can be extended and be closed at its end in order to form a centring device. In this case, the ring 21 can be force-fitted in the sleeve 16, as described in the document FR-96 07 146. In this case the ring 21 can be made from synthetic material, so that the presence of the bearing 54 is not obligatory.

Naturally, the ring 22 can be fixed by crimping, deforming the sleeve 16.

The presence of the torsion damper is not obligatory. The disc 24 can be made integral in rotation with lugs for the mortise and tenon connection 4, the said lugs being secured to an annulus fixed to the turbine wheel. The disc 24 can be embedded in a friction lining 22 intended to be clamped between the piston 20 and wall 11.

The presence of the bearing 54 is not obligatory. This is because a pilot bearing can be mounted in the blind hole 120 in order to centre the end of the driven shaft.

In all cases a pilot bearing is provided, such as the bearing 54, in order to ensure good concentricity between the hub 5 and centring device 21.

By virtue of the holes 229, 29 it is possible to fix the tongues 26 locally, for example by welding or bonding, respectively to the piston 20 and to the wall 11. It will be appreciated that the solution in FIG. 7 is favourable since the hydraulic pressure prevailing in the main chamber presses the shouldered plug 339 against the piston 20.

What is claimed is:

1. Hydrokinetic coupling appliance, having an input element (10), in the form of a casing, able to be made integral with respect to rotation with a driving shaft and provided with an axially fixed transverse wall (11), an output element (5) in the form of a hub, a centering device (21) having a blind hole (120) at a center and being integral with the transverse wall (11) whilst being interposed axially between the latter and the hub (5), a piston (20) mounted at an internal periphery so as to be axially movable with respect to the transverse wall (11) whilst being connected to said wall (11) with respect to rotation, at least one friction lining (22) able to be clamped disengageably between the external periphery of the piston (20) and the transverse wall (11), and means for fixing the friction lining (22) to the hub (5), characterized in that, the hub (5) having an internally fluted socket (50) for connecting the hub (5) with a driven shaft (201) with respect to rotation, the said socket (50) enters inside the blind hole (120) in the centering device (21), in that the hub (5) has, parallel to said socket (50) and radially above said socket (50), an axially oriented annular rim (52) whose external periphery constitutes a guide surface (59) for the piston (20), and in that a sealing joint (56) acts between the rim (52) and the piston (20).

2. Appliance according to claim 1, characterized in that the rim (52) is shorter axially than the socket (50) and defines with the latter a recess (53).

3. Appliance according to claim 2, characterized in that the centering device (21) enters the recess (53) through a rear end (123) of reduced diameter belonging to a rear portion (122) of the centring device (21).

4. Appliance according to claim 3, characterized in that the guide surface (59) on the rim (52) of the hub (5) is roughly axially aligned with the larger-diameter external periphery of the centering device (21).

5. Appliance according to claim 4, characterized in that a clearance exists between the external periphery of the rear portion (122) of the centering device (21) entering the recess (53) and the internal periphery of the rim (52).

6. Appliance according to claim 5, characterized in that an axial clearance exists between the free end of the rim (52)

and a shoulder (124) formed by the change in diameter which the rear portion (122) has for an entry into the recess (53).

7. Appliance according to claim 3, characterized in that an axial stop (55) is mounted in the bottom of the recess (53) for cooperation with the rear face of the centering device (21).

8. Appliance according to claim 3, characterized in that a bearing (54) acts between the external periphery of the socket (50) and the internal periphery of the centering device (21).

9. Appliance according to claim 2, characterized in that the rim (52) belongs to a transversely oriented shield (51) fixed to the socket (50) and forming the bottom of the recess (53).

10. Appliance according to claim 9, characterized in that the shield (51) has a groove (57) for housing an axial stop (58) intended to cooperate with the rear face of a ferrule (128) which the piston (20) has at said internal periphery for its sliding along the guide surface (59).

11. Hydrokinetic coupling appliance according to claim 1, characterized in that two friction linings (22) are disposed on each side of a drive disc (24) integral with the hub (5) with respect to rotation and in that the said linings are able to be clamped between the piston (20) and the transverse wall (11).

12. Appliance according to claim 11, characterized in that the friction linings (22) are secured to the drive disc (24) rotatably connected to the hub (5) by means of a torsion damper (3), in that the torsion damper has two symmetrically shaped guide rings (60, 61) disposed on each side of a damper plate (8) fixed at its internal periphery to the hub (5) and in that the drive disc (24) is rotatably connected to the guide rings (60, 61) by a connection of the mortise and tenon type (4).

13. Appliance according to claim 1, characterized in that the piston (20) is rotatably connected to the transverse wall (11) by elastic tongues (26) fixed at one of their ends to the transverse wall and at their other end to the piston (20), and in that one of the piston (20) and transverse wall (11) pieces has holes (29, 229) closed off by plugs (129, 339) for fixing the tongues (26).

* * * * *